W. P. HART.
BUTTER CUTTER.
APPLICATION FILED APR. 3, 1906. RENEWED AUG. 4, 1909.
949,929.
Patented Feb. 22, 1910.
2 SHEETS—SHEET 1.
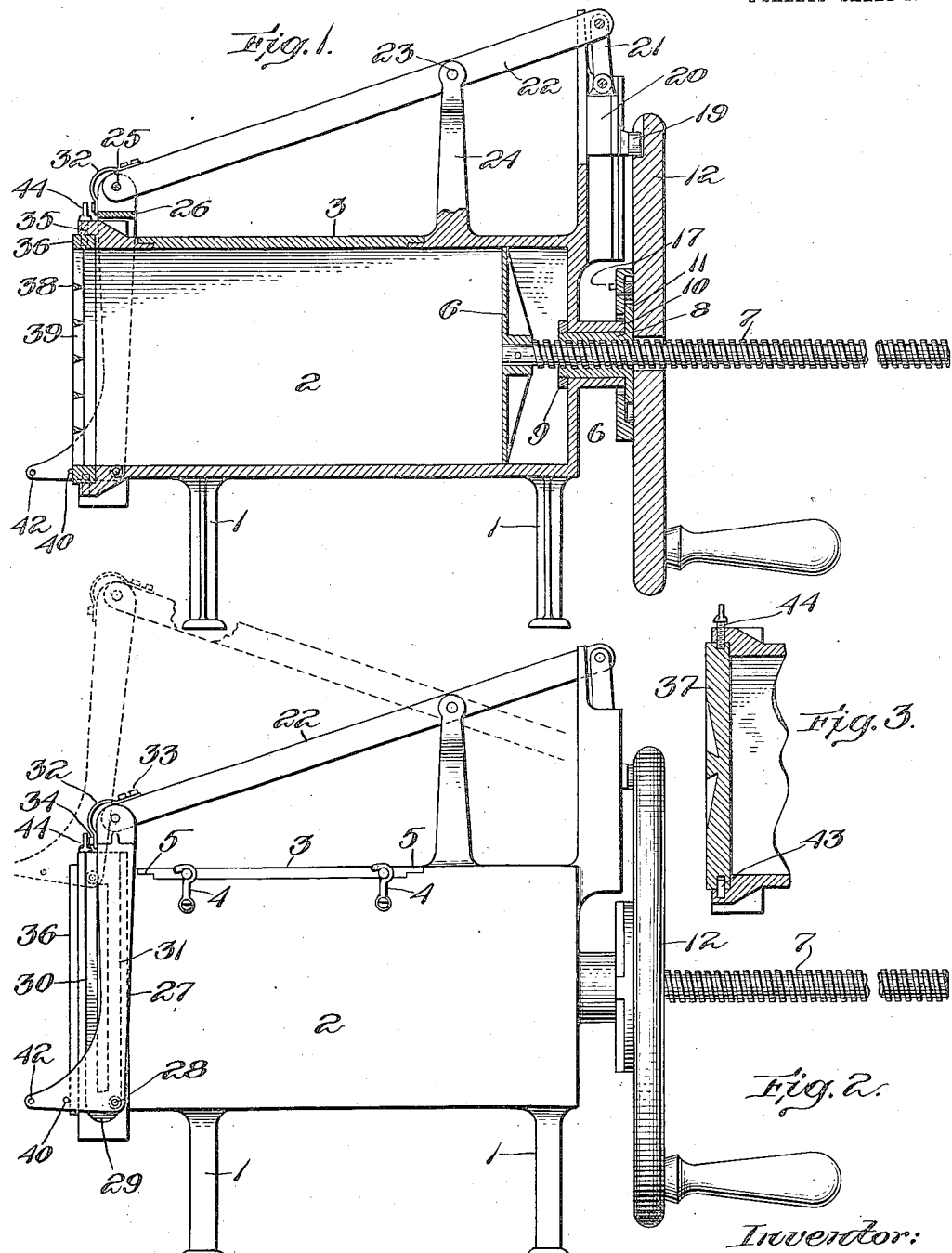
Witnesses:
Walter H. Naylor
Wm. J. Pike
Inventor:
William P. Hart,
by Geo. H. Maxwell,
Attorney.

W. P. HART.
BUTTER CUTTER.
APPLICATION FILED APR. 3, 1906. RENEWED AUG. 4, 1909.
949,929.
Patented Feb. 22, 1910.
2 SHEETS—SHEET 2.
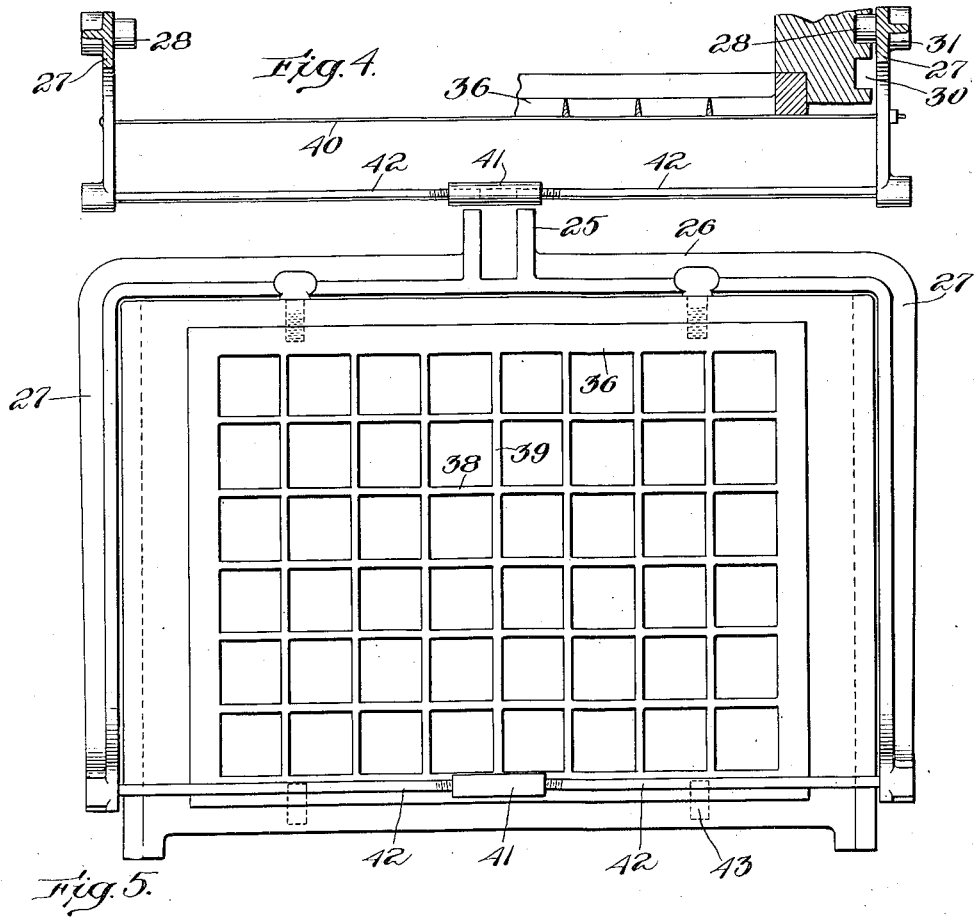
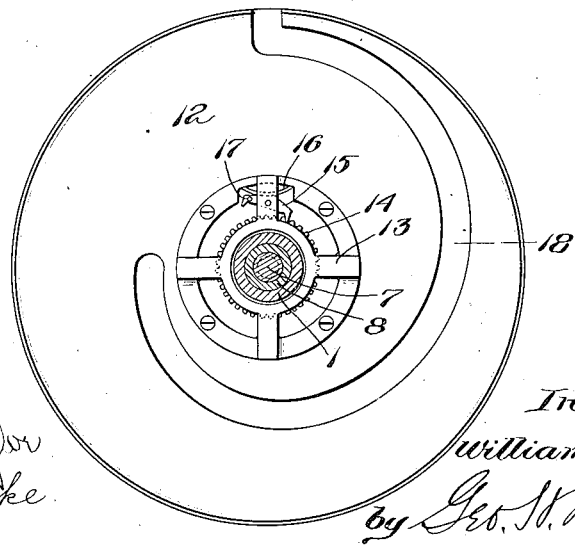
Witnesses:
Inventor:
William P. Hart,
by Geo. W. Maxwell,
Attorney.

UNITED STATES PATENT OFFICE.

WILLIAM P. HART, OF BOSTON, MASSACHUSETTS, ASSIGNOR TO THE AUTOMATIC INDIVIDUAL BUTTER CUTTER CO., OF BOSTON, MASSACHUSETTS, A CORPORATION OF MAINE.

BUTTER-CUTTER.

949,929.  Specification of Letters Patent.  Patented Feb. 22, 1910.

Application filed April 3, 1906, Serial No. 309,669.  Renewed August 4, 1909.  Serial No. 511,254.

*To all whom it may concern:*

Be it known that I, WILLIAM P. HART, a citizen of the United States, residing at Boston, in the county of Suffolk and State of Massachusetts, have invented an Improvement in Butter-Cutters, of which the following description, in connection with the accompanying drawings, is a specification, like numerals on the drawings representing like parts.

My invention is a machine for cutting butter into small pieces, such as are required for individual use, the machine being particularly intended and adapted to restaurant use, although with slight structural variations it may be adapted to a much wider field of usefulness.

Various machines have been proposed for cutting butter into small cubes and other shapes, and my invention is an improvement whereby the cutting is absolutely uniform and progressive, and practically without waste, while at the same time proceeding with great rapidity and economy of time, power and material.

I provide means for first compressing the butter and then moving it forward step by step for cutting it longitudinally into columns of such cross-sectional shape as may be desired, and then quickly cutting off the ends of these columns transversely to their length. The small pieces of butter thus cut off are permitted to drop into a bucket of water or other convenient receptacle, and meanwhile the transverse cutter has been restored automatically to the proper position for a new cut, and thus the machine operates continuously until all the contained butter has been cut.

The constructional details of my invention will be pointed out more at length in the course of the following description, reference being had to the accompanying drawings, in which I have shown a preferred embodiment of my invention.

In the drawings, Figure 1 is a central vertical longitudinal section of a machine embodying my invention; Fig. 2 is a view thereof in side elevation; Fig. 3 is a sectional detail of the front portion as shown in Fig. 1, provided with a retainer plate instead of the longitudinal cutter plate; Fig. 4 is an enlarged vertical sectional detail of a portion of the machine; Fig. 5 is a view in elevation, of the front end of the machine; Fig. 6 is a transverse sectional view, showing the operating cam and adjacent parts in elevation.

On suitable pedestals 1 is mounted a butter holder or chamber 2, herein shown as rectangular in shape, although it will be understood that the particular shape of the butter holder or tank and also the shape into which the butter is finally cut, may be varied according to the desire or requirements of its particular use. The butter holder 2 is normally closed by a cover 3, detachably secured by any suitable locking means, as by hooks 4, said cover being provided with tight joints 5 at its opposite end, especially formed to open upwardly for the purposes of cleanliness. Within the butter holder I provide a plunger in the form of a strong head 6, removably secured to the forward end of a screw 7, which I employ as the preferable means of securing the step by step forward movement desired, said screw operating in a threaded sleeve or nut 8 clamped by a nut 9 in a hub 10 provided at the rear end of the box or holder 2. Said sleeve or nut 8 is provided with a lateral flange or integral gear 11 at its rear end, projecting outwardly into the open space provided between a cam wheel 12 and a spider or retainer 13, secured to the inner face of said cam wheel 12, in position to have its teeth 14 engaged by a double acting dog 15, normally held in position by a spring 16, as is clearly shown in Fig. 6, so that when said dog is tilted into either of its inclined positions it will be yieldingly held in such position by said spring. For convenience the dog has a pin 17 at one end to be engaged by the operator for shifting the dog when desired. The cam wheel contains an eccentric groove 18 in its inner surface, to be engaged by a roll 19, projecting from a plunger 20 connected by a pivoted link 21 to a walking beam or lever 22 pivoted at 23 to a support 24, mounted on the box 2. The lever 22 is pivotally connected at 25 to a yoke 26 whose depending legs 27 span the box 2 at its front end, as clearly shown in Figs. 1, 2, 4, and 5. At their lower ends the legs 27 are provided with rolls or lugs 28, traveling in ways 29, formed in the opposite sides of the box or butter holder 2, as shown clearly in Fig. 2. The way 29 branches into a forward vertical portion 30 and a rear vertical portion 31, so that the lugs 28 travel up the latter and down the former, being automatically shifted from one position to the other by a spring 32 secured at 33 to the lever 22, and at 34 to the yoke 26, said spring being so formed that it is placed under tension by the change of angle between the yoke and lever when the latter are in their two extreme positions, shown respectively in full lines and in dotted lines Fig. 2.

At its front end the butter holder 2 is provided with a peripheral ledge or rabbet 35, for receiving a cutter plate 36, see Figs. 1, 4 and 5, or a retainer plate 37, see Fig. 3, said cutter plate being provided with strong transverse bars or cutters 38, 39, and having its outer surface projecting slightly beyond the box or holder 2, as clearly shown in the drawings.

Mounted in the lower projecting ends of the legs 27 of the yoke 26 I provide a knife or wire cutter 40 in position to slide in contact with the outer face of the cutter plate 36, when said legs are held in backward position by the lugs 28 traveling in the ways 31, said cutter wire 40 being stretched taut by a turn buckle 41 and rods 42, see Figs. 4 and 5. The cutter plate 36 and the retainer plate 37 may be held in position by any strong means permitting their quick removal and substitution for each other, pins 43 being herein shown for engaging the bottom edge of said plates, and screws 44 for engaging the top edge thereof. The particular shape in cross section of the cutters 38, 39, I consider of importance. It will be observed that these blades are sharp at their inner edges, and diverge outwardly, or in other words are wedge-shaped in cross section. I have found that in practice it is not feasible to cut the butter into small cubes under pressure by a thin blade or cutter means, as the butter immediately reunites as soon as it has been pressed beyond the cutter, and accordingly I have made the cutters wedge-shaped, thereby compelling the columns to separate sufficiently to prevent their reuniting, and also compressing the individual columns firmly laterally, so that all unevenness is prevented and all cavities are closed. Also the wedge-shaped cutters restrain to a slight extent the free outward movement of the butter, so that the movement thereof is uniform across the entire face of the moving mass.

It will be observed that all the butter-containing parts of my apparatus are of such a construction that they can be readily cleaned, this being of special importance in handling butter.

In use the operator first inserts the retainer plate 37 and then removes the cover 3 and fills the butter chamber or holder 2 full of butter in such shape and pieces as it may be brought to him. He then closes and locks the cover and then presses forward the plunger 6 by its screw-operating means, until the butter is solidly compressed into one compact mass. He then takes out the retainer 37 and puts in place the cutter frame 36. Having done this, he reciprocates the cam wheel back and forth to the extent of its cam path 18, with the result that the butter is cut into small cubes which drop from the front of the machine as they are formed. This is accomplished thus: Let it be supposed that the machine is in the position shown in full lines in Figs. 1 and 2. The operator takes hold of the handle of the cam wheel and pulls the same forward and up, thereby turning the wheel over to the right. This causes the lugs 28 of the yoke 26 to travel upward in the ways 31, thereby moving the cutter knife or wire 40 transversely of the cutter plate 36 in sliding contact therewith. During this operation the butter mass in the holder has been stationary, the plunger 6 not having been operated, inasmuch as the dog 15, being in the position shown in Fig. 6, has simply clicked over the gear teeth 14. As soon as the cam wheel has been rocked so as to bring the roll 19 to the inner end of the cam path 18, the lugs 28 will have reached the top of the ways 31 and will then be automatically shifted by the spring 32 into the forward dotted position Fig. 2. The operator then reverses the movement of the cam wheel, which moves the butter forward by reason of the engagement of the dog 15 with the teeth 14 of gear 11, which rotates the nut 8 on the screw 7 and at the same time returns the cutter wire 40 to its original position, said wire, however, being moved in a path entirely beyond the butter by reason of the fact that the lugs 28 travel in the outer ways 30. As soon as the cam wheel has been given a semi-rotation, so as to bring the parts again into the position shown in Fig. 2, the cutter wire 40 is instantly shoved tightly against the cutter plate 36 as the yoke 26 is swung back to its full line position by the spring 32, and thereupon the operator again reverses the rotation of the cam wheel, causing the cutter wire 40 to travel upwardly again as before, the forward movement of the butter in the holder 2 meanwhile ceasing. The cutting of the butter by the wire 40 proceeds from the bottom, and as the individual pieces are cut off, they drop into a tub of water or the like, said individual pieces having been previously entirely separated from each other and individually compressed laterally by the wedge-shaped cutters 38, 39. The foregoing operations proceed rapidly as the operator simply rocks the cam wheel back and forth, all the cutting movements being accomplished easily and automatically. When all the butter in the holder 2 has been molded and cut, the operator presses downwardly on the pin 17 so as to reverse the engagement of the dog 15 with the teeth 14 of the gear 8 and then removes one of the pivot pins of the link 21 and lifts the stud 19 out of the cam path 18, whereupon he quickly retracts the plunger 6 by turning the cam wheel over to the right until the screw 7 has been turned out to the position shown in Fig. 1. The machine is then ready for another charge of butter.

The apparatus may be made of any suitable material, but I prefer to make it all of cast metal, suitably plated, to prevent corrosion under the action of the acid of the butter.

Having described my invention, what I claim as new and desire to secure by Letters Patent is, 1. In a machine for cutting butter, a butter holder, a plurality of transversely extending cutters at one end thereof, a plunger at the opposite end thereof, a screw extending centrally lengthwise of the holder rearwardly from the plunger, a nut threaded on the screw for operating said plunger, said nut being provided with a ratchet gear, and operating means for operating said ratchet gear.

2. In a machine for cutting butter, a butter holder, and means at one end thereof for cutting the butter transversely, including a movable cutter, a carrier therefor, guiding mechanism for moving said cutter in a path close to the holder during its cutting operation, and in a return path at a distance from said holder, and mechanism for moving said cutter and its carrier.

3. In a machine for cutting butter, a butter holder, cutting means at one end thereof, a plunger at the opposite end thereof for pressing the butter forward to said cutting means, a non-rotatable screw extending rearwardly from said plunger for operating the latter, a rotatable nut threaded on said screw and held against longitudinal movement, a pawl and ratchet mechanism for intermittently rotating said nut, said pawl being shiftable into position to engage said nut for rotating the nut in either direction, and operating means for said pawl and ratchet mechanism.

4. In a machine for cutting butter, a butter holder, cutting means at one end thereof for cutting the butter transversely, means for pressing the butter forward toward said cutting means, and operating mechanism, movable back and forward for intermittently actuating said cutting means and alternately actuating said pressing means, movement of said mechanism in one direction serving to operate said cutting means, and movement thereof in the opposite direction serving to operate said pressing means.

5. In a machine for cutting butter, a butter holder, cutting means at one end thereof for cutting the butter transversely, means for pressing the butter forward toward said cutting means, and operating mechanism, including a cam and pawl-and-ratchet, movement of said cam in one direction actuating said cutting means to cut the butter, and movement of said cam in the opposite direction actuating said pawl-and-ratchet to move said pressing means forward.

In testimony whereof, I have signed my name to this specification, in the presence of two subscribing witnesses.

WILLIAM P. HART.

Witnesses:
 GEO. H. MAXWELL,
 WM. J. PIKE.